May 23, 1961 A. Y. CUNNINGHAM ET AL 2,984,901
METHOD OF MAKING COMPOSITE METAL STRIPS
Filed March 10, 1955
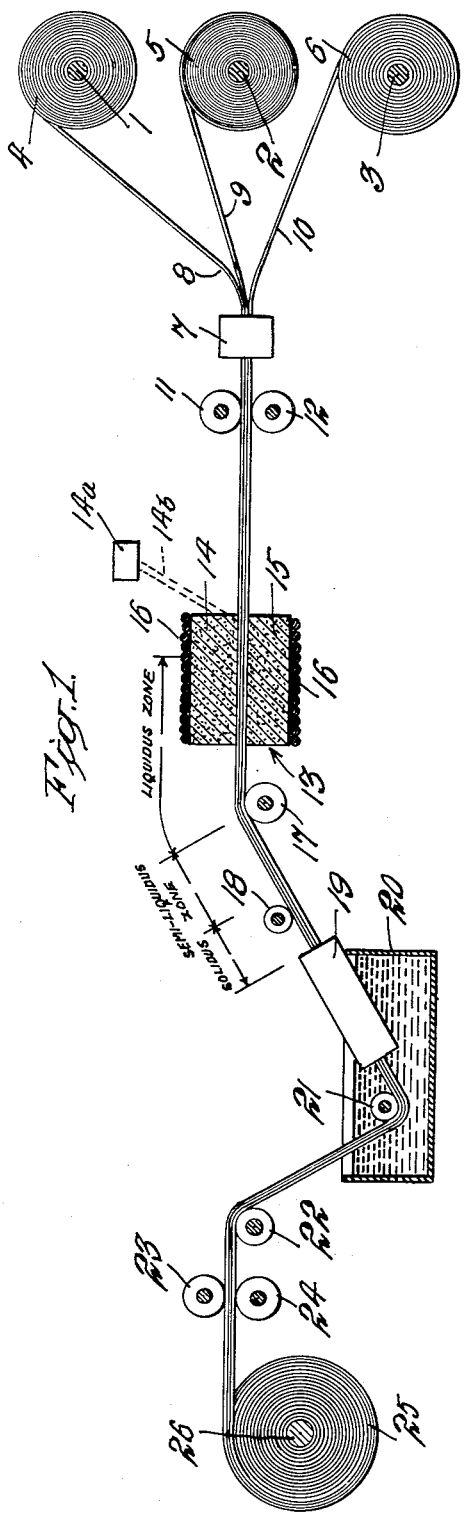
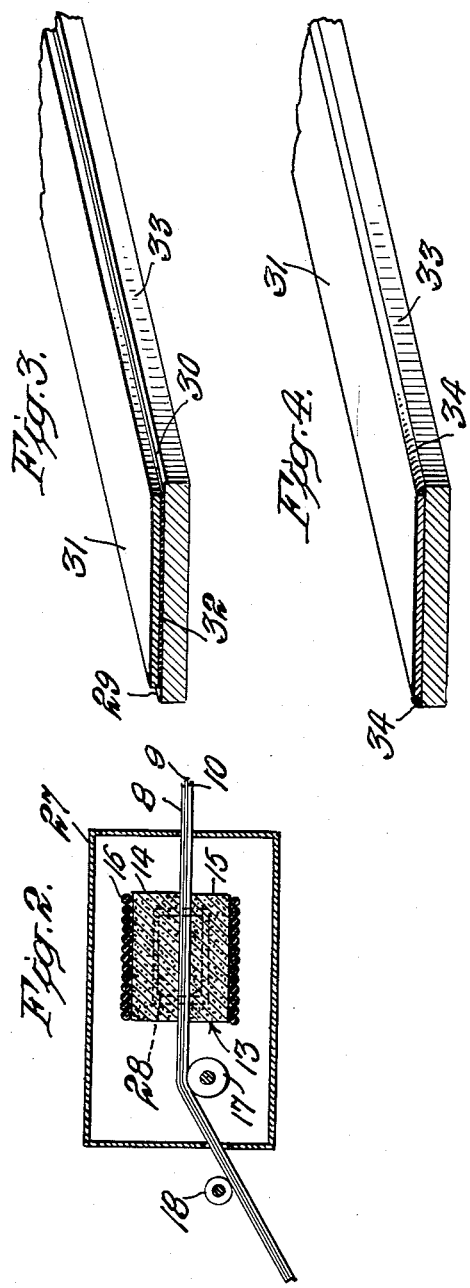
INVENTORS
ALEXANDER Y. CUNNINGHAM
WILLIAM F. MITTENDORF
BY
ATTORNEY United States Patent Office 2,984,901
Patented May 23, 1961

2,984,901
METHOD OF MAKING COMPOSITE
METAL STRIPS

Alexander Y. Cunningham, Attleboro, and William F. Mittendorf, Medfield, Mass., assignors, by mesne assignments, to Engelhard Industries, Inc., Newark, N.J., a corporation of Delaware Filed Mar. 10, 1955, Ser. No. 493,536

5 Claims. (Cl. 29—487)

The present invention relates to composite metal strips and more particularly to the method of making laminated metal strips comprising a base metal layer and a precious metal layer.

Composite metal strips comprising a base metal layer and a precious metal layer with or without a solder therebetween are well known in the art. Such composite metal strips are provided by various methods directed primarily toward improvements in the structural character of the composite strip; for example, an even distribution of a precious metal on a base metal, a composite material free of "orange peel" effect, a composite material with a controlled ratio of one metal with respect to the other metal, and also toward an economical method for the production of the composite material.

A conventional method of making a composite strip material, such as rolled gold or gold plate, involves the soldering of a bar of gold or gold alloy to a bar of base metal and passing the composite bar through reducing rolls under heavy pressure at repeated 10% reductions and anneals. When the rolled gold is reduced to a predetermined thickness, the bond interface exhibits substantial plastic deformation or irregularity with a resultant non-uniform thickness of the gold layer, and the further reduction of the gold layer is limited to a thickness such as would prevent the base metal from showing through or otherwise deleteriously affecting the gold layer.

Another conventional method involves the manufacture of a composite material comprising a wide base metal strip with a narrow metal strip superposed thereon and with a solder layer therebetween, both strips being separately preformed to desirable thickness, and passing the combined strips through a heated pressure zone including heated pressure rolls, blocks, and the like whereby the solder is liquified under heat and pressure and on subsequent cooling bonds the two strips.

While the latter method has certain advantages over the former method, especially with regard to controlled and event distribution of the precious metal layer and the condition of the bond interface, it has certain limitations and disadvantages when applied to gold filled or precious metal coated stock especially where the composite layers are of substantially the same width. In such case, the excess molten solder forced outwardly from between the layers creeps onto the surface of the precious metal layer whereupon the properties of the composite material are deleteriously affected, especially with regard to use in the electrical industry. Furthermore, when the combined strips leave the pressure zone, and while the solder is still in the molten state, there is a tendency for both strips to separate slightly with respect to each other; for example, by relaxing with respect to each other on release of pressure, whereby another condition of solder creepage occurs, i.e. between the strips. The solder creepage, therefore, is not only detrimental with respect to the surface of the strips, but it prevents control of an optimum solder film between the combined strips, the optimum condition occurring when the solder film is of a thickness just sufficient when solidified to bond the strips together and without excessive alloying with the combined metals.

It is an object of the present invention to provide a method and apparatus for the production of composite metal strips. It is another object of the present invention to provide a method and apparatus for the production of composite metal strips characterised by a bond interface of an optimum solder content. It is a further object of the present invention to provide a method for bonding different metals to produce a composite metal strip. It is a still further object of the present invention to provide a method of bonding metal strips by controlling solder creepage in the bonding process. Other objects and advantages of the present invention will become apparent from the description hereinafter following and the drawings forming a part hereof, in which:

Figure 1 is a partly schematic and partly diagrammatic view of the apparatus for carrying out the present invention, Figure 2 is a partly schematic and partly diagrammatic partial view of Figure 1, including a modification thereof, Figure 3 is a perspective view of a composite metal according to the invention prior to the bonding operation, and Figure 4 is a perspective and cross-sectional view of a composite metal after the bonding operation.

The present invention relates to an apparatus and method in the production of composite material comprising a plurality of metal strips bonded together while controlling the solder creepage of a solder employed therebetween and maintaining the control of said solder during the bonding operation until the solder solidifies and bonds the strips together with an optimum solder interface, said optimum solder interface comprising a solder zone or film of a thickness just sufficient to bond the strips together and without excessive alloying with the combined metals.

Figure 1 illustrates one form of apparatus for carrying out the invention hereinafter more particularly described. The apparatus comprises mounting means 1, 2, and 3 on which are mounted rolls of strip metal 4, 5, and 6, with the intermediate or middle roll 5 being a roll of strip solder. The metal strips are passed from their respective rolls and in superposed position with respect to each other through a strip guide member 7 which positions and guides the plurality of strips 8, 9, and 10 in proper superposed alignment with respect to each other. At a location preferably forward of the guide member 7 is a pair of vertically aligned pressure rolls or motivating rolls 11 and 12 which act to move the positioned strips toward a heating means generally designated as 13 and which comprises a pair of heated pressure means 14 and 15, which may constitute upper and lower heated member with the combined strips 7, 8, and 9 positioned and passing therebetween, said heated members comprising either metallic members and preferably non-metallic members and in particular carbon members, at least one of which is connected to a pressure adjusting means 14a by conventional linkage 14b shown as broken lines. Heating of the pressure members is provided by either electrical resistance means in electrical contact therewith and preferably by means of high frequency induction heating including the high frequency windings 16 wound about both of the members 14 and 15. While the members 14 and 15 are herein stated as being pressure members, the pressure exerted on the strips in the heating zone between the members is not an excessive pressure, but a pressure sufficient to press the strips 8 and 10 toward each other so that when the solder strip 9 is in a molten condition the excess molten solder between the strips 8 and 10 is extruded outwardly from between the said strips 8 and 10. The pressure exerted by the pressurized members 14 and 15 is preferably just sufficient to cause the said extrusion of the excess solder without reducing the thickness of the strips 8 and 10. Consequently, it is apparent that the solder between the strips is in a molten or liquidus condition as the strips leave the heating zone, i.e. the heating members 14 and 15. However, when the strips 8 and 10 pass outwardly or forwardly from between the heater members, the said strips are caused to relax with respect to their contiguous relationship, whereupon some of the solder in molten condition creeps inwardly between the strips under the combined action of the cohesion of the solder and the relaxation of the strips. Under such condition, there will always remain excess solder between the strips 8 and 10, over and above the optimum solder content sufficient to bond the strips and at least to some extent providing a solder interfacial area characterized by an undesirably large alloy area, which, of course, would limit the ratio of one metal with respect to the other in subsequent reducing operation should such be desirable.

Therefore, in order to control the interfacial creepage of the solder above described, it has been found extremely beneficial to further pressurize the bonded strips 8 and 10 while the solder therebetween is still in the molten condition and preferably the semi-liquidus condition over the entire semi-liquidus zone range or the semi-liquidus range and part of the liquidus range of the solder. A preferred method for accomplishing the above is to provide such a pressurization of the combined strips by a continuous change of direction or bending of the combined strips during at least the entire semi-liquidus condition of the solder. For example, after the combined strips leave the furnace or the heating zone and at a location in the path of the traveling combined strips where the solder is in a plastic state, the traveling composite strip is further pressurized as above described. Structurally, there is positioned a direction changing means forwardly of the heating means and at a location prior to the solidification of the solder and preferably between the liquidus and semi-liquidus condition of the solder. The direction changing means comprises a pivot 17 such as a bar or roll. It will be apparent that as the travelling strip passes over the pivot 17 the weight of the combined strip beyond the pivot will provide for an arcing or curvilinear form, said curvature causing a pressurization of the strips. Otherwise, especially when the pressurization is to be limited to a designated portion or length of the travelling strip a directional guide means 18 is positioned forward of the pivot 17 and on the opposite side of the said strip. Preferably, the guide 18 is located at a position where the solder is in the solidus state. Since the travelling strip is pressurized as above described, there is provided a control of the interfacial creepage of the solder and the interfacial bond is characterized by an optimum bond free of excess solder.

Upon passing the above described pressurized zone, the travelling strip passes into a jacketed cooling chamber 19 containing a reducing atmosphere and wherein the composite strip is cooled under the influence of said reducing atmosphere. In order to prevent the escape of the reducing atmosphere, the open exit end of the chamber is provided with a liquid gas seal by immersing the exit end of the chamber 19 in a container 20 containing the liquid, e.g. water. Thereafter, the composite strip passes over a travel guide 21 in said container 20 and outwardly thereof over another travel guide 22 and between a pair of pulling or motivating rolls 23 and 24 which assist in moving the strip along its travelling path, and which may be synchronized with the motivating rolls 11 and 12. The bonded composite strip is finally provided as a rolled strip 25 on a roll support 26.

While Figure 1 illustrate a method and apparatus for providing a rolled composite strip, it is apparent that for heavier gauge composite material not amenable for rolling, the strips may follow the critical stages with the omission of the roll supports and the travel guides associated therewith, as for example, by passing through the stages illustrated by Figure 2.

Figure 2 shows a modification of Figure 1 to the extent that at least the heating zone including the heating means 14 and 15 and preferably the heating zone and pressurization zone associated with the change of direction of the travelling strip are confined within a reducing atmosphere chamber 27, which is provided with a window 28 whereby the melting of the solder between the heating means may be visually observed.

As hereinbefore stated, when at least two strip members 8 and 10 of equal width are to be bonded, such strip members are subject to another form of solder creepage, i.e. the creepage of solder to the surface of the metal strips. In order to preclude such solder creepage, longitudinal solder reservoirs 29 and 30 are provided along both longitudinal edges of combined composite strip as illustrated by Figure 3. The said solder reservoirs are formed by making the top strip or layer 31 and the solder strip 32 slightly narrower than the bottom layer or strip 33. The difference in width between the strip 31 and 33 being predetermined in accordance with the solder volume and being such that the solder fillet 34, as illustrated by Figure 4 will substantially fill the said longitudinal reservoir, and the combined upper strip 31 and the pair of solder fillets 34 having a width substantially equal to that of the lower strip 33. For example, as the combined or composite strip passes through the heating means 14 and 15, the extruded excess solder forms the fillets 34, but in the liquid state of the solder, the reservoirs have just sufficient capacity to hold the molten solder therein without permitting the solder to rise over and on the surfaces of the strips.

While the method and apparatus herein contemplated have been described specifically with regard to the illustrations, it is not intended that the scope of the invention be limited thereto so long as equivalent means for carrying out the method of the invention are possible; for example, the solder strip referred to may be eliminated and the equivalent solder may be applied by solder flushing or coating one or both metal strips before bonding.

What we claim is:

1. The method of bonding a plurality of metal strips of substantially equal width having a layer of solder therebetween, comprising combining and passing said strips into a heating zone, melting said solder in said heating zone while exerting pressure on said combined strips and simultaneously extruding excess molten solder from between said strips, passing said combined strips outwardly of said heating zone, maintaining said strips together and continuously exerting pressure on said combined strips over at least the entire semi-liquidus zone of the solder by continuously bending said combined strips by a continuous change of direction of travel while simultaneously continuously tensioning said strips over at least the entire semi-liquidus zone of the solder while the solder passes from at least the semi-liquidus state to the solidus state.

2. The method according to claim 1, wherein the said bending of said combined strips is continued while the solder passes from the liquidus to the solidus state.

3. The method according to claim 1, wherein the combined strip is cooled upon solidification of the solder.

4. The method according to claim 1, wherein the combined strip is cooled under the influence of a reducing atmosphere upon solidification of the solder.

5. The method of bonding a plurality of elongated metal members having a layer of solder therebetween, comprising combining and passing said metal members into a heating zone, melting said solder in the heating zone, passing the combined metals outwardly of the heating zone and exerting continuous pressure on said solder layer over at least the entire semi-liquidus zone of the solder by continuously bending said combined members by a continuous change of direction of travel while simultaneously continuously tensioning said strips over at least the entire semi-liquidus zone of the solder while the solder passes from the semi-liquidus to the solidus state.

References Cited in the file of this patent

UNITED STATES PATENTS

| | | |
|---|---|---|
| 132,338 | Warden | Oct. 15, 1872 |
| 1,764,271 | Leonard | June 17, 1930 |
| 2,089,103 | Sims | Aug. 3, 1937 |
| 2,137,617 | Imes | Nov. 22, 1938 |
| 2,380,107 | Hobrock | July 10, 1945 |
| 2,627,010 | Matteson | Jan. 27, 1953 |
| 2,722,735 | Beamish | Nov. 8, 1955 |
| 2,737,917 | Steele | Mar. 13, 1956 |
| 2,740,459 | Kilborn et al. | Apr. 3, 1956 |
| 2,748,734 | Kennedy | June 5, 1956 |
| 2,753,623 | Boessenkool et al. | July 10, 1956 |
| 2,754,784 | Maysmor et al. | July 17, 1956 |
| 2,788,838 | Crabbe et al. | Apr. 16, 1957 |
| 2,860,409 | Boessenkool et al. | Nov. 18, 1958 |

FOREIGN PATENTS

| | | |
|---|---|---|
| 300,272 | Great Britain | Jan. 17, 1929 |